United States Patent [19]

Shu et al.

[11] Patent Number: 5,796,929
[45] Date of Patent: Aug. 18, 1998

[54] BANDING AND INK-BLEEDING REDUCTION IN CLUSTER DITHER BY SCREEN DISPLACEMENT

[75] Inventors: Joseph S. Shu; Chia-Hsin Li, both of San Jose, Calif.

[73] Assignee: Seiko Epson Corporation, Tokyo, Japan

[21] Appl. No.: 741,426

[22] Filed: Oct. 24, 1996

[51] Int. Cl.$^6$ .................................. G06F 15/00
[52] U.S. Cl. ............................ 395/109; 358/534
[58] Field of Search ................... 395/19, 101, 102, 395/107, 108, 117; 358/534, 535, 536, 502, 298, 457, 456, 458, 465, 466, 455, 459; 347/15; 382/162, 163, 164, 167, 251, 252

[56] References Cited

U.S. PATENT DOCUMENTS

| | | | |
|---|---|---|---|
| 4,920,501 | 4/1990 | Sullivan et al. | 358/458 |
| 5,045,931 | 9/1991 | Sakamoto | 358/454 |
| 5,377,024 | 12/1994 | Dillinger | 358/502 |
| 5,394,252 | 2/1995 | Holladay et al. | 358/534 |
| 5,428,377 | 6/1995 | Stoffel et al. | 347/15 |
| 5,469,266 | 11/1995 | Usami et al. | 358/298 |
| 5,493,323 | 2/1996 | Harrington | 358/298 |
| 5,557,709 | 9/1996 | Shu | 395/109 |
| 5,594,839 | 1/1997 | Shu | 395/109 |
| 5,633,729 | 5/1997 | Smith et al. | 358/456 |
| 5,684,932 | 11/1997 | Shu | 395/109 |
| 5,701,366 | 12/1997 | Ostromoukhov et al. | 395/109 |
| 5,715,073 | 2/1998 | Miller | 358/534 |

*Primary Examiner*—Edward L. Coles
*Assistant Examiner*—Dov Popovici
*Attorney, Agent, or Firm*—Eric B. Janofsky

[57] ABSTRACT

A controller for an ink-jet printer (26) half-tones three color-component values in clustered-dot dither operations (80, 82, and 84) that employ respective dither arrays whose cluster centers are displaced from each other. Additionally, a half-toning operation (86) is performed on a fine-resolution black value obtained from the color-component values in an undercolor-removal operation (59) in which the resultant black value is less, throughout most of the component-value range, than the minimum of the color-component values from which the black value is derived. The banding effects that would otherwise result from ink bleeding are thereby greatly reduced. The banding effects can be further reduced by performing black-component half-toning in a non-cluster-dot-dither operation, without detracting significantly from the intended clustered-dot dither effect.

36 Claims, 4 Drawing Sheets

BANDING AND INK-BLEEDING REDUCTION IN CLUSTER DITHER BY SCREEN DISPLACEMENT

BACKGROUND OF THE INVENTION

The present invention is directed to ink-jet printers. It particularly concerns reduction of banding and bleeding in color printers.

A digitally expressed color image is quite often stored or expressed as three-dimensional values of picture elements ("pixels") that in combination make up the image. The pixel value represents a location in a color space. Most typically, that color space is the red-green-blue color space or, complementarily, the cyan-magenta-yellow color space. That is, the color components respectively represent red, green, and blue or cyan, magenta, and yellow. Other color spaces are used less frequently.

Most digital imaging systems express the pixel-value components with a relatively fine value resolution at some point in the processing. (Note that we refer here to value resolution, e.g., eight bits per pixel component, as opposed to spatial resolution, e.g. 300 dots per inch.) Although the components are thus limited to discrete values, the larger number of such values has given rise to the expression continuous tone to images so expressed. In contrast, although there are some arrangements that apply ink dots of different sizes, most apply only single-sized dots, so the control for a given color component is binary: the dot is either applied or not at any given pixel location.

To employ such single-bit-resolution control to simulate the higher component-value resolution of the original pixels, printer drivers employ half-toning, which yields different intensity effects by applying dots in different percentages of the output-pixel locations. If the component-value range is 255, for instance, and a particular component's value is 255 throughout a region, then all pixel locations in that region receive a dot of the ink whose color is associated with that component. If the component value is 128, the other hand, only 128 out of every 255 pixels receive ink of that color.

A widely used approach to performing half-toning digitally is called "ordered dithering." Elements of a dither array of predetermined and generally different threshold values are associated with respective image pixels: the array conceptually overlies the image pixel array. If the dither array is smaller than the image array, the dither array is replicated and "tiles" the image array to produce a repetitive pattern. Each pixel thus has two values conceptually associated with it, namely, the requested pixel tonal value and the corresponding dither-array elements. These two values' comparison yields that pixel's value in the output, binary-valued image.

Although dither arrays of many varieties have been used for this purpose, most fall into two categories, namely, dispersed-dot dither arrays and clustered-dot dither arrays. Dispersed-dot dither arrays are characterized by a threshold pattern in which the threshold values are distributed relatively evenly about the array; i.e., higher-valued thresholds tend to be located near lower-valued thresholds. This generally even pattern is considered preferable in many applications, but not in all. There are some applications in which the user would prefer having an effect somewhat reminiscent of that produced by traditional screening processes. In such applications, clustered-dot dither is preferred. The high-valued thresholds in a clustered-dot dither array tend to be clustered together, and the low-valued thresholds do, too. The result is a pattern of larger or smaller clusters to represent darker or lighter regions, just as larger or smaller screen-printing dots do.

Unfortunately, obtaining this effect comes at a cost in high-spatial-resolution ink-jet printers. Color printers typically combine three or four ink color components—usually, cyan, magenta, and yellow, and often black in addition—to achieve a wide color spectrum. The quality of the intended color rendition deteriorates when ink dots of different colors bleed into each other excessively. And such bleeding particularly afflicts clustered-dot dithering, since a complex interaction between the dither array and the printer's mechanical scanning mechanism results in bands of darker and lighter colors in regions intended to be uniform.

SUMMARY OF THE INVENTION

We have found a way of greatly reducing such banding effects while largely retaining the clustered-dot-dither appearance. Our method retains clustered-dot dither arrays for at least a plurality of the color components, but it uses different arrays for different components so that the locations in which the threshold clusters occur in different components' dither arrays are offset from each other. On the average, this tends to decrease different-colored ink dots' coincidence and thus reduces bleeding.

Preferably, clustered-dot dither arrays are retained only for the color components; using a dispersed-dot dither array for black-ink half-toning greatly reduces the incidence of banding without significantly impairing the clustered-dot-dither effect. But we have also found a way of reducing the banding incidence when a clustered-dot dither array is employed for black ink. In accordance with a second aspect of our invention, the high-resolution black value used as the input to the half-toning process is obtained in a way that differs from the approach that is conventionally employed with clustered-dot dithering. In both our approach and the conventional one, the black-component value is determined from the values of the three color components, which are that modified to accommodate black-ink use. The resultant black-component value and modified color-component values are the inputs to the half-toning process, in which those component values are compared with the dither-array thresholds. In the conventional approach, the the fine-resolution black value equals lowest of the three unmodified color-component values, and the three color components' values are modified by subtracting that value from them. In contrast, we have found the banding effects can be reduced greatly if the black value is made less than the lowest of the three unmodified color components throughout most of the component-value range.

The reason for this approach's beneficial effects appears to result from the following fact. In dark regions having a significant black content, the ink clusters that result from this approach have black-ink centers surrounded by a region of composite black (cyan, magenta, and yellow together resulting in a black appearance without the use of black ink itself) that may in turn be surrounded by two- and one-component regions. Any black-ink bleeding therefore occurs in composite-black regions and thus has very little adverse effect on appearance.

BRIEF DESCRIPTION OF THE DRAWINGS

The invention description below refers to the accompanying drawings, of which.

DETAILED DESCRIPTION OF ILLUSTRATIVE EMBODIMENTS

Figure 1:
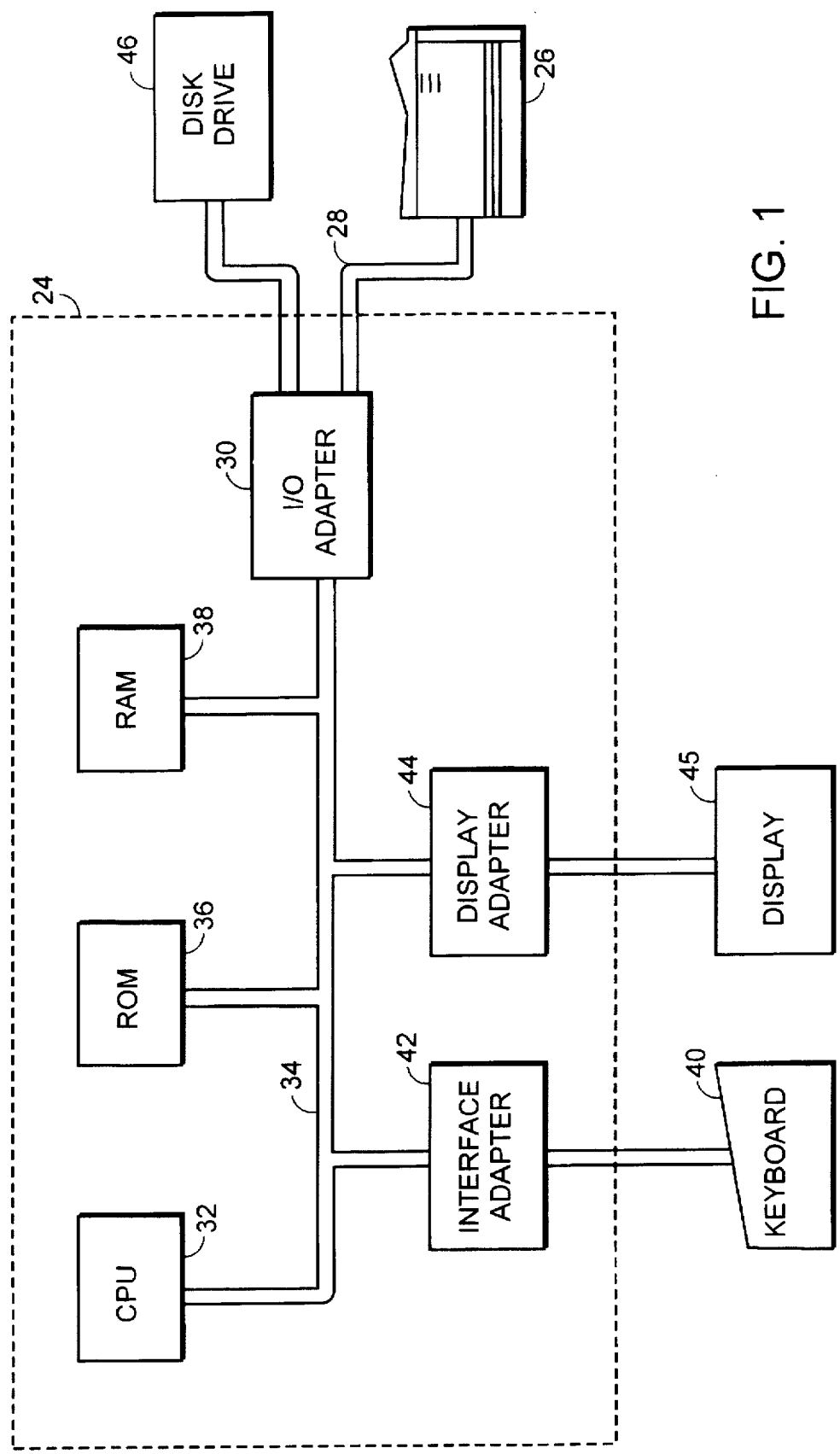
FIG. 1 is a block diagram of a computer system in which the present invention's teachings may be practiced.

As the invention description proceeds, it will become apparent that the invention can be embodied in dedicated circuitry designed particularly to implement the invention's teachings. Such an arrangement can be included within a printer that receives instructions in terms of nominal colors, and the dedicated circuitry can be designed to convert the requested values to printer instructions in accordance with the present invention's approach. But the invention will more typically be implemented in a general-purpose machine, such as a personal computer operating as a printer driver, whose purpose is to convert an image expressed in nominal color values into printer commands that comply with specified printer- and medium-dependent limitations. (Since the most-frequent use of the term driver in these contexts is colloquially to refer to the software that configures the computer to act as a driver, we will hereafter adopt the nomenclature printer controller to refer to the hardware configured for this purpose. This nomenclature will apply even to controllers not implemented in computers.) FIG. 1 depicts a typical hardware environment. A personal computer 24 sends a display device such as an ink-jet printer 26 low-level instructions, i.e., instructions that specify which individual display-medium pixels should receive dots. The drawing depicts the printer 26 as receiving these instructions by way of an appropriate channel 28. Computers that can embody the present invention come in a wide variety of configurations, and FIG. 1 depicts one in which channel 28 is provided by an input-output adapter 30 with which a central processing unit 32 communicates by way of an internal bus 34.

Of course, the central processing unit 32 typically fetches data and instructions at various times from a variety of sources, such as solid-state read-only and read-write memories 36 and 38. FIG. 1 depicts the computer 24 as also communicating with the usual keyboard 40 by way of an interface adapter 42. And a display adapter 44 usually couples a cathode-ray-tube display 45 to the central processing unit 32 by way of the bus 34.

The computer 24 typically implements the present invention's teachings when it functions as a printer controller. Operating-system software transferred to the computer's disc drive 46 and stored in a disc that the drive contains usually includes instructions that configure the computer to perform this function. The driver software will often have been loaded into the computer system from another storage medium, such as a diskette or CD-ROM. In any event, the computer 24 reads the printer-driver instructions from the disc drive in most cases and then performs the below-described functions to implement the present invention's teachings.

Figure 2:
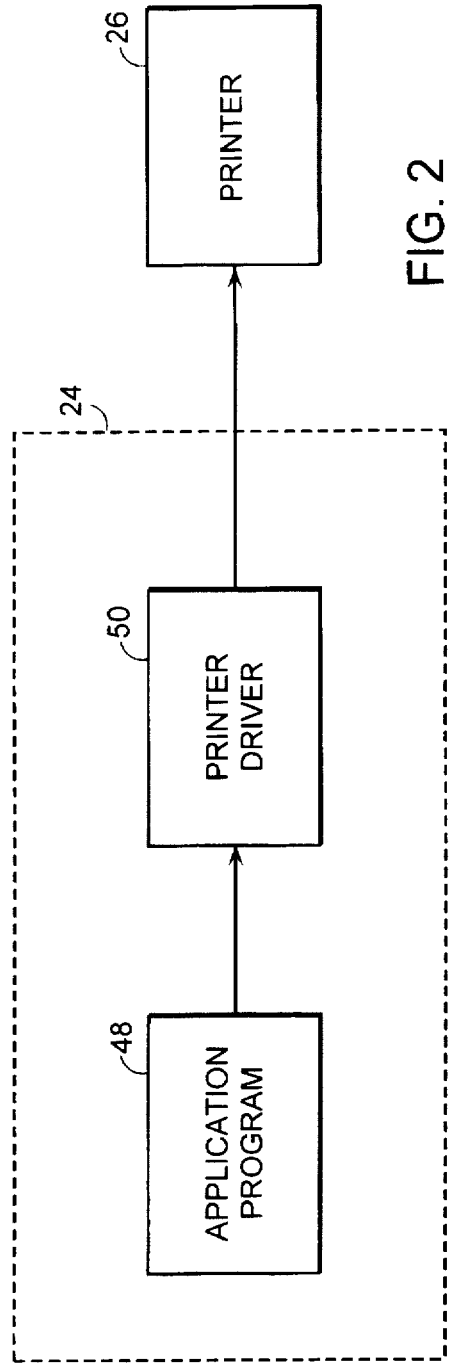
FIG. 2 is a block diagram that depicts the system of FIG. 1 from more of a software perspective.

FIG. 2 depicts the invention's environment from more of a software standpoint. The present invention's teachings usually come into play when the computer 24 is operating a user's application program 48 and that program makes a system call requesting that an image be printed. A printer driver 50, which is usually considered to be part of the operating system but is specific to the designated printer, performs the requested operation. The printer driver's purpose is to convert a device-independent representation of the image into low-level printer instructions that will cause the printer 26 to render that image as faithfully as the printer's limitations permit.

Figure 3:
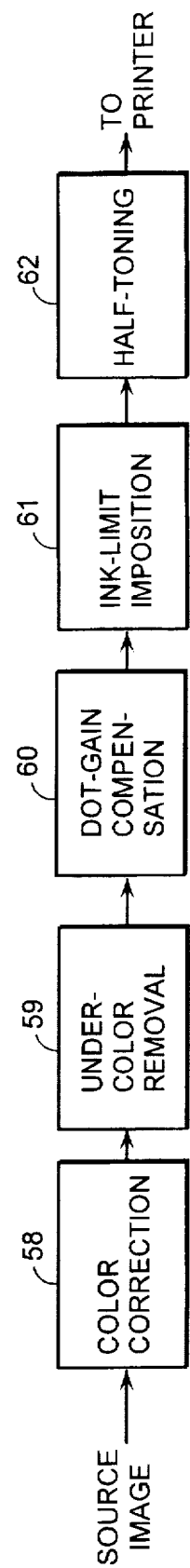
FIG. 3 is a block diagram of a typical image-processing sequence in which the present invention's teachings may be employed.

The typical printer controller performs a sequence of image-revision steps to generate print instructions from signals that represent the source image. FIG. 3 represents a typical image-revision sequence. The inks employed to display the stored image do not precisely match the ideal colors that they are intended to represent, so the printer controller typically adjusts the values from those that represent combinations of ideal colors to values that will cause the non-ideal inks to approach the intended color more closely. FIG. 3's block 58 represents such a color-correction step.

In developing commands for printers that can deposit black and colored inks on the same image, some printer controllers derive a fine-value-resolution black value from the color-component values and adjust the color-component values to compensate for the black component addition. Block 59 represents such an "undercolor-removal" step, which will be described in more detail below in connection with FIGS. 7 and 8. The controller may also revise the values to account for the fact that the apparent color darkness does not increase linearly with the percentage of pixels on which ink drops are deposited. Block 60 represents such an "dot-gain-compensation" step.

Once the controller has determined values that would cause the inks to approximate the requested colors most closely, it may need to compromise in order to comply with a limit on the chosen medium's ability to absorb ink without bleeding. Block 61 represents the imposition of the necessary ink-duty limit. The result is an image in which the pixel-component values are expressed with a relatively fine resolution, such as eight or twelve bits per color component. To obtain the coarser—typically binary—resolution required for printer operation, the controller performs a half-toning step 62 that employs the present invention's teachings to generate instructions determined by the resultant coarse values and send them to the printer.

Figure 4:
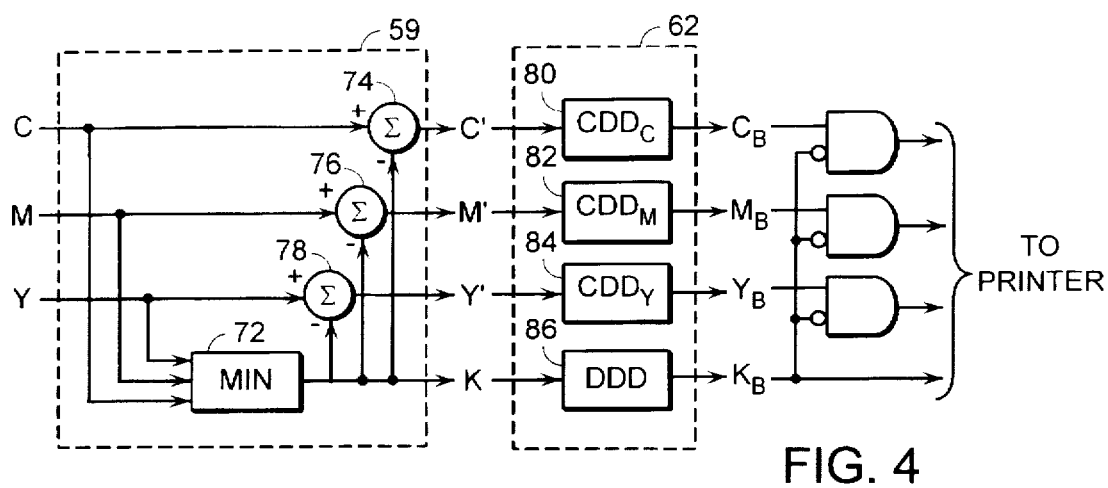
FIG. 4 is a more-detailed block diagram of the undercolor-removal and half-toning operations of FIG. 3.

Although the image-revision steps that FIG. 3 depicts are typical, the present invention does not require all of them, and the present invention's embodiments that do employ them all will not necessarily employ them in the illustrated order. But the undercolor-removal and half-toning operations 59 and 62 are of particular importance to various of the present invention's aspects, so FIG. 4 illustrates them in more detail, with the other steps removed for the sake of simplicity. In operation 72, one embodiment's undercolor-removal operation 59 identifies the lowest of its input cyan, magenta, and yellow values C, M, and Y. It uses the result as the fine-resolution black value K. The undercolor-removal process also produces adjusted fine-resolution color-component values C', M', and Y' from the input C, M, and Y values by subtracting the K value from them in operations 74, 76, and 78.

The half-toning process then determines binary values $C_B$, $M_B$, $Y_B$, and $K_B$ from the high-value-resolution values C', M', Y', and K. In the embodiment of FIG. 4, the half-toning process 62 includes comparing those values with the thresholds of respective dither arrays in individual half-toning operations 80, 82, 84, and 86. Operations 80, 82, and 84 use respective clustered-dot-dither arrays to determine binary values $C_B$, $M_B$, and $Y_B$ from the high-value-resolution color-component values C', M', and Y', whereas operation 86 employs a dispersed-dot dither array to obtain the binary black value $K_B$.

At any given pixel, colored ink is excluded if black ink is applied. That is, if $K_B$ is one, the other binary values are reset to zero, as gates 88 indicate.

By employing a dispersed-dot dither operation 86 on the fine-value-resolution black value K, the FIG. 4 embodiment greatly reduces undesired banding without significantly compromising the intended clustered-dot-dither half-toning effect. But the FIG. 4 embodiment additionally reduces banding even further—while retaining clustered-dot dither arrays for the color components—by a judicious selection of clustered-dot dither arrays.

Figure 5:
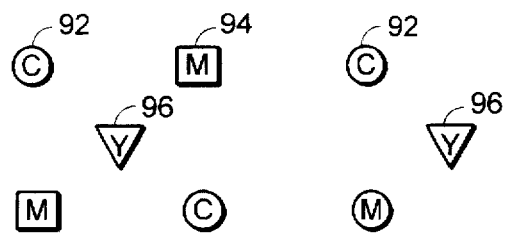
FIG. 5 is a diagram depicting the relative positions, in one embodiment of the invention, of the threshold clusters in the dither arrays used for different color components.

FIG. 5 illustrates the relationships among the color components' dither arrays. As was mentioned above, clustered-dot dither arrays are characterized by a clustering of the lowest-valued thresholds in such a manner that the printer deposits ink-dot clusters whose sizes grow with color darkness. Clustered-dot dither arrays can thus be conveniently described by the locations of those clusters' centers, and FIG. 5 uses this approach to illustrate the relationship among three clustered-dot dither arrays.

Specifically, circles 92 represent the locations of the ink-cluster centers that the cyan component's clustered-dot dither array produces. Similarly, squares 94 and triangles 96 respectively characterize the magenta and yellow components' dither arrays. Perusal of FIG. 5 reveals that the magenta component's threshold pattern is horizontally spaced from the cyan component's by one half the cluster spacing, while the yellow component's thresholds are offset both horizontally and vertically by one-quarter of the cluster spacing.

Each of the individual-component arrays in FIG. 5 is said to result in a 45° "screen" because the line from a given cluster to the next-row cluster for the same component forms an angle of 45° with a line to the same-component cluster two rows below.

Figure 6:
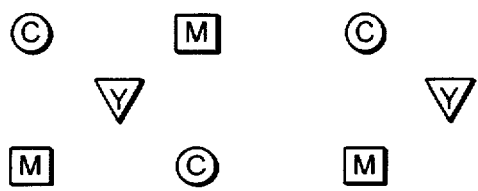
FIG. 6 is a diagram similar to FIG. 5 depicting dither arrays used in another embodiment of the invention.

FIG. 6 depicts another dither-array relationship that could be used. In this arrangement, circles, squares, and triangles represent the respective components' cluster centers as before. The individual-component screens are of the type commonly referred to as hexagonal, the magenta dither array is displaced to the right by one-third of the horizontal cluster spacing from the cyan-array cluster centers, and the yellow cluster centers are displaced from the cyan cluster centers by two-thirds of that spacing.

Neither of these arrangements is critical. Indeed, it may be acceptable—although we do not consider it preferable—to employ the same array for, say, both cyan and magenta and a different array for yellow.

Figure 7:
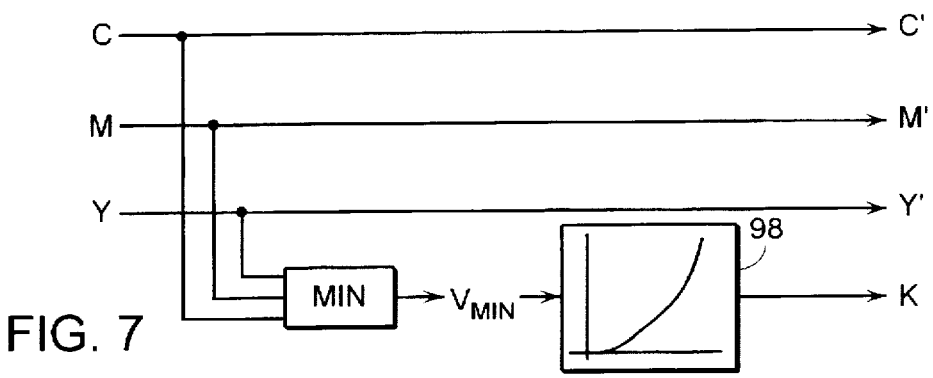
FIG. 7 is a block diagram depicting an alternative embodiment of the undercolor-removal process.
Figure 8:
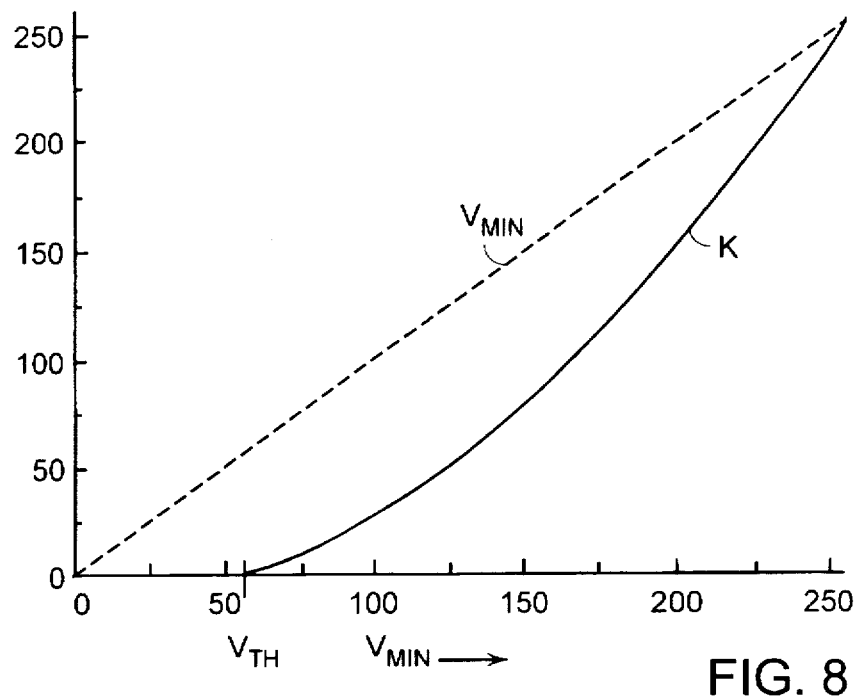
FIG. 8 is a plot of the relationship between fine-value-resolution black value and the minimum of the cyan, magenta, and yellow values before undercolor removal.

FIG. 4's fine-value-resolution black value is simply the minimum of the cyan, magenta, and yellow values before undercolor removal. This is not a necessary requirement, and FIG. 7 illustrates an alternative approach. The FIG. 7 approach uses an additional operation 98 to determine a fine-resolution black value that is not in general equal to the minimum $V_{min}$ of the cyan, magenta, and yellow values before undercolor removal. In the approach that FIG. 7 depicts, the relationship between the fine-resolution black value K and the other components' pre-undercolor-removal minimum $V_{min}$ is a function plotted in FIG. 8. FIG. 8 shows that the black value K is less than the other components' pre-undercolor-removal minimum $V_{min}$ for most of the component-value range. Indeed, the K value is zero until the other components' minimum $V_{min}$ reaches a predetermined threshold value $V_{th}$. In the illustrated embodiment, it remains less than $V_{min}$ for all values up to the top of the component-value range, where the fine-resolution black value K finally equals the other components' minimum value $V_{min}$. The illustrated embodiment employs a quadratic relationship above the threshold $V_{th}$, but the particular function employed to obtain the fine-resolution black value is not critical. What is important to certain aspects of the invention is that throughout most of the range of $V_{min}$ the value of K is considerably less than the minimum value $V_{min}$. We prefer that the black value K bear a ratio to its value range's maximum that is less than or equal to the square of the ratio borne to its range by the color-component minimum $V_{min}$.

Thus producing the high-resolution K value can so reduce banding effects that in some applications the results may be considered satisfactory even without displacing the dither arrays. In an arrangement in which all components-including black-were half-toned with a common clustered-dot-dither array, we observed significant banding reduction resulting solely from this alternative black-value-generation approach. As FIG. 7 indicates, that arrangement did not subtract the black value from the color values, so the half-toning input values C', M', and Y', equaled the values C, M, and Y from which the high-resolution black value K was calculated.

Figure 9:
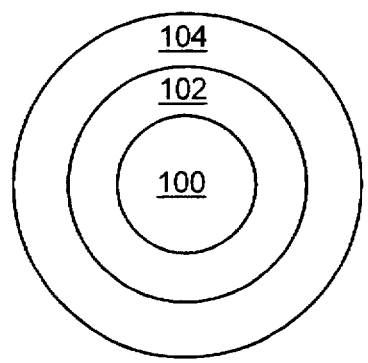
FIG. 9 is a diagram of an ink-deposition cluster that results from yet another embodiment of the present invention.

FIG. 9 illustrates the type of ink cluster that results from such an arrangement, i.e., from one in which high-resolution values produced as FIG. 7 illustrates are half-toned in accordance with a common clustered-dot-dither array. For a region in which all three color-component values are relatively high, the region in the cluster's center 100 receives black ink only, while a region 102 around it receives composite black, i.e., a black appearance produced by using all three color components without actually using black ink. If the C, M, and Y values are not all the same, a further region 104 results that receives only one or two of the color components.

We believe that this cluster arrangement is beneficial because, as was observed above, black ink makes the most-significant contribution to bleeding effects and thus banding, and perusal of FIG. 9 reveals that black ink can bleed only in the composite-black region, where the intended effect is black, anyway. Only color-component inks can bleed into the sole colored area 104.

It is thus apparent that the teachings of the present invention can be practiced in a wide range of embodiments. It thus constitutes a significant advance in the art.

I claim:

1. For operating an ink-jet printing mechanism to produce a display in response to electrical source-image signals representing a source image consisting of a plurality of image components associated with respective color components and collectively specified by values of an array of pixels of which the image consists, the value of each pixel consisting of a plurality of relatively fine-resolution component values associated with that pixel, a method comprising the steps of:

A) performing a sequence of at least one image-revision step, in which sequence each image-revision step receives electrical signals representing an input image consisting of input pixels and produces therefrom electrical signals representing an output image consisting of output pixels, the input image of a first image-revision step is the source image, the input image of any subsequent image-revision step is the output image of a preceding image-revision step, and one said image-revision step is a half-toning step, the input pixels of whose input image collectively specify a plurality of half-tone-input color-component images, the value of each input pixel of the half-toning step's input image including fine-resolution half-tone-input color-component values associated with respective ones of the half-tone-input color-component images, the half-toning step including:

i) performing a half-toning operation on a first of the half-tone-input color-component images by comparing the first half-tone-input color-component image's fine-resolution half-tone-input color-component values with quantization thresholds of a first clustered-dot-dither array thereof; and ii) performing a half-toning operation on a second of the half-tone-input color-component images by comparing the second half-tone-input color-component image's fine-resolution half-tone-input color-component values with quantization thresholds of a second clustered-dot-dither array thereof, the quantization thresholds of the first and second clustered-dot-dither arrays forming clusters that are spatially offset from each other; and B) applying to the ink-jet printing mechanism electrical command signals that represent the output of a last image-revision step.

2. A method as defined in claim 1 wherein the half-toning step includes performing a half-toning operation on a third of the half-tone-input color-component images by comparing the third half-tone image's fine-resolution half-tone-input color-component values with quantization thresholds of a third clustered-dot-dither array thereof that form clusters spatially offset from the clusters formed by the first and second clustered-dot-dither arrays.

3. A method as defined in claim 1 wherein:

A) the input pixels of the half-toning step's input image additionally specify a half-tone-input black-component image;

B) the value of each input pixel of the half-toning step's input image includes a fine-resolution half-tone-input black-component value associated with the half-tone-input black-component image; and C) the half-toning step further comprises performing a non-clustered-dot-dither half-toning operation on the half-tone-input black-component image.

4. A method as defined in claim 3 wherein the non-clustered-dot-dither half-toning operation performed on the half-tone black-component image is performed by comparing the fine-resolution half-tone black-component values with quantization thresholds of a dispersed-dot-dither array.

5. A method as defined in claim 3 wherein the half-toning step includes performing a half-toning operation on a third of the half-tone-input color-component images by comparing the third half-tone image's fine-resolution half-tone-input color-component values with quantization thresholds of a third clustered-dot-dither array thereof that form clusters spatially offset from the clusters formed by the first and second clustered-dot-dither arrays.

6. A method as defined in claim 1 wherein:

A) one image-revision step of the sequence of at least one image-revision step is a black-value-derivation step that precedes the half-toning step;

B) each input pixel of the black-value-derivation step's input image consists of fine-resolution black-value-derivation-input color components; and C) each output pixel of the black-value-derivation step's output image corresponds to a respective one of the input pixels of the black-value-derivation step's input image and consists of fine-resolution black-value-derivation-output color components and a fine-resolution black-value-derivation-output black component that the black-value-derivation step determines in accordance with a function of the respective input pixel's black-value-derivation-input color components in which the value of the black-value-derivation-output black component is less than the minimum of the black-value-derivation-input color components' values throughout most of that minimum's range.

7. A method as defined in claim 6 wherein:

A) the black-value-derivation-input color components and black-value-derivation-output black component are expressed within a range that has a range maximum value; and B) a ratio that the black-value-derivation-output black component bears to the range maximum value is less than or equal to the square of the ratio that the minimum of the black-value-derivation-input color components' values bears to the range maximum.

8. A method as defined in claim 7 wherein:

A) the input pixels of the half-toning step's input image additionally specify a half-tone-input black-component image;

B) the value of each input pixel of the half-toning step's input image includes a fine-resolution half-tone-input black-component value associated with the half-tone-input black-component image; and C) the half-toning step further comprises performing a non-clustered-dot-dither half-toning operation on the half-tone-input black-component image.

9. A method as defined in claim 8 wherein the half-toning step includes performing a half-toning operation on a third of the half-tone-input color-component images by comparing the third half-tone image's fine-resolution half-tone-input color-component values with quantization thresholds of a third clustered-dot-dither array thereof that form clusters spatially offset from the clusters formed by the first and second clustered-dot-dither arrays.

10. A method as defined in claim 7 wherein the half-toning step includes performing a half-toning operation on a third of the half-tone-input color-component images by comparing the third half-tone image's fine-resolution half-tone-input color-component values with quantization thresholds of a third clustered-dot-dither array thereof that form clusters spatially offset from the clusters formed by the first and second clustered-dot-dither arrays.

11. For operating an ink-jet printing mechanism to produce a display in response to electrical source-image signals representing a source image consisting of a plurality of image components associated with respective color components and collectively specified by values of an array of pixels of which the image consists, the value of each pixel consisting of a plurality of relatively fine-resolution component values associated with that pixel, a method comprising the steps of:

A) performing a sequence of image-revision steps, in which sequence each image-revision step receives electrical signals representing an input image consisting of input pixels and produces therefrom electrical signals representing an output image consisting of output pixels, the input image of a first image-revision step is the source image, and the input image of any subsequent image-revision step is the output image of a preceding image-revision step, wherein:

i) one said image-revision step of the sequence of the image-revision steps is a black-value-derivation step each input pixel of whose input image consists of fine-resolution black-value-derivation-input color components and each output pixel of whose output image corresponds to a respective one of the input pixels of the black-value-derivation step's input image and consists of fine-resolution black-value-derivation-output color components and a fine-resolution black-value-derivation-output black component that the black-value-derivation step determines in accordance with a function of the respective input pixel's black-value-derivation-input color components in which the value of the black-value-derivation-output black component is less than the minimum of the black-value-derivation-input color components' values throughout most of that minimum's range; and ii) a subsequent image-revision step in the sequence of image-revision steps is a half-toning step, the input pixels of whose input image collectively specify a plurality of half-tone-input color-component images and a half-tone-input black-component image, the value of each input pixel of the half-toning step's input image including fine-resolution half-tone-input color-component values associated with respective ones of the half-tone-input color-component images and a fine-resolution half-tone-input black-component value associated with the half-tone-input black-component image, the half-toning step including:

a) performing a half-toning operation on a first of the half-tone-input color-component images by comparing the first half-tone-input color-component image's fine-resolution half-tone-input color-component values with quantization thresholds of a first clustered-dot-dither array thereof; and b) performing a half-toning operation on a second of the half-tone-input color-component images by comparing the second half-tone-input color-component image's fine-resolution half-tone-input color-component values with quantization thresholds of a second clustered-dot-dither array thereof; and B) applying to the ink-jet printing mechanism electrical command signals that represent the output of a last image-revision step.

12. A method as defined in claim 11 wherein:

A) the black-value-derivation-input color components and black-value-derivation-output black component are expressed within a range that has a range maximum value; and B) a ratio that the black-value-derivation-output black component bears to the range maximum value is less than or equal to the square of the ratio that the minimum of the black-value-derivation-input color components' values bears to the range maximum.

13. For printing an image in response to electrical source-image signals representing a source image consisting of a plurality of image components associated with respective color components and collectively specified by values of an array of pixels of which the image consists, the value of each pixel consisting of a plurality of relatively fine-resolution component values associated with that pixel, an apparatus comprising:

A) an ink-jet printing mechanism operable to apply ink to a print medium;

B) image-revision circuitry for performing a sequence of at least one image-revision step, in which sequence each image-revision step receives electrical signals representing an input image consisting of input pixels and produces therefrom electrical signals representing an output image consisting of output pixels, the input image of a first image-revision step is the source image, the input image of any subsequent image-revision step is the output image of a preceding image-revision step, and one said image-revision step is a half-toning step, the input pixels of whose input image collectively specify a plurality of half-tone-input color-component images, the value of each input pixel of the half-toning step's input image including fine-resolution half-tone-input color-component values associated with respective ones of the half-tone-input color-component images, the half-toning step including:

i) performing a half-toning operation on a first of the half-tone-input color-component images by comparing the first half-tone-input color-component image's fine-resolution half-tone-input color-component values with quantization thresholds of a first clustered-dot-dither array thereof; and ii) performing a half-toning operation on a second of the half-tone-input color-component images by comparing the second half-tone-input color-component image's fine-resolution half-tone-input color-component values with quantization thresholds of a second clustered-dot-dither array thereof, the quantization thresholds of the first and second clustered-dot-dither arrays forming clusters that are spatially offset from each other;

C) output circuitry for applying to the ink-jet printing mechanism electrical command signals that represent the output of a last image-revision step.

14. An apparatus as defined in claim 13 wherein the half-toning step includes performing a half-toning operation on a third of the half-tone-input color-component images by comparing the third half-tone image's fine-resolution half-tone-input color-component values with quantization thresholds of a third clustered-dot-dither array thereof that form clusters spatially offset from the clusters formed by the first and second clustered-dot-dither arrays.

15. An apparatus as defined in claim 13 wherein:

A) the input pixels of the half-toning step's input image additionally specify a half-tone-input black-component image;

B) the value of each input pixel of the half-toning step's input image includes a fine-resolution half-tone-input black-component value associated with the half-tone-input black-component image; and C) the half-toning step further comprises performing a non-clustered-dot-dither half-toning operation on the half-tone-input black-component image.

11

16. An apparatus as defined in claim 15 wherein the non-clustered-dot-dither half-toning operation performed on the half-tone black-component image is performed by comparing the fine-resolution half-tone black-component values with quantization thresholds of a dispersed-dot-dither array.

17. An apparatus as defined in claim 15 wherein the half-toning step includes performing a half-toning operation on a third of the half-tone-input color-component images by comparing the third half-tone image's fine-resolution half-tone-input color-component values with quantization thresholds of a third clustered-dot-dither array thereof that form clusters spatially offset from the clusters formed by the first and second clustered-dot-dither arrays.

18. An apparatus as defined in claim 13 wherein:
   A) one image-revision step of the sequence of at least one image-revision step is a black-value-derivation step that precedes the half-toning step;
   B) each input pixel of the black-value-derivation step's input image consists of fine-resolution black-value-derivation-input color components; and
   C) each output pixel of the black-value-derivation step's output image corresponds to a respective one of the input pixels of the black-value-derivation step's input image and consists of fine-resolution black-value-derivation-output color components and a fine-resolution black-value-derivation-output black component that the black-value-derivation step determines in accordance with a function of the respective input pixel's black-value-derivation-input color components in which the value of the black-value-derivation-output black component is less than the minimum of the black-value-derivation-input color components' values throughout most of that minimum's range.

19. An apparatus as defined in claim 18 wherein:
   A) the black-value-derivation-input color components and black-value-derivation-output black component are expressed within a range that has a range maximum value; and
   B) a ratio that the black-value-derivation-output black component bears to the range maximum value is less than or equal to the square of the ratio that the minimum of the black-value-derivation-input color components' values bears to the range maximum.

20. An apparatus as defined in claim 19 wherein:
   A) the input pixels of the half-toning step's input image additionally specify a half-tone-input black-component image;
   B) the value of each input pixel of the half-toning step's input image includes a fine-resolution half-tone-input black-component value associated with the half-tone-input black-component image; and
   C) the half-toning step further comprises performing a non-clustered-dot-dither half-toning operation on the half-tone-input black-component image.

21. An apparatus as defined in claim 20 wherein the half-toning step includes performing a half-toning operation on a third of the half-tone-input color-component images by comparing the third half-tone image's fine-resolution half-tone-input color-component values with quantization thresholds of a third clustered-dot-dither array thereof that form clusters spatially offset from the clusters formed by the first and second clustered-dot-dither arrays.

22. An apparatus as defined in claim 19 wherein the half-toning step includes performing a half-toning operation on a third of the half-tone-input color-component images by comparing the third half-tone image's fine-resolution half-tone-input color-component values with quantization thresholds of a third clustered-dot-dither array thereof that form clusters spatially offset from the clusters formed by the first and second clustered-dot-dither arrays.

23. For operating an ink-jet printing mechanism to produce a display in response to electrical source-image signals representing a source image consisting of a plurality of image components associated with respective color components and collectively specified by values of an array of pixels of which the image consists, the value of each pixel consisting of a plurality of relatively fine-resolution component values associated with that pixel, an apparatus comprising:
   A) an ink-jet printing mechanism operable to apply ink to a print medium;
   B) image-revision circuitry for performing a sequence of image-revision steps, in which sequence each image-revision step receives electrical signals representing an input image consisting of input pixels and produces therefrom electrical signals representing an output image consisting of output pixels, the input image of a first image-revision step is the source image, and the input image of any subsequent image-revision step is the output image of a preceding image-revision step, wherein:
      i) one said image-revision step of the sequence of image-revision steps is a black-value-derivation step each input pixel of whose input image consists of fine-resolution black-value-derivation-input color components and each output pixel of whose output image corresponds to a respective one of the input pixels of the black-value-derivation step's input image and consists of fine-resolution black-value-derivation-output color components and a fine-resolution black-value-derivation-output black component that the black-value-derivation step determines in accordance with a function of the respective input pixel's black-value-derivation-input color components in which the value of the black-value-derivation-output black component is less than the minimum of the black-value-derivation-input color components' values throughout most of that minimum's range; and
      ii) a subsequent image-revision step in the sequence of image-revision steps is a half-toning step the input pixels of whose input image collectively specify a plurality of half-tone-input color-component images and a half-tone-input black-component image, the value of each input pixel of the half-toning step's input image including fine-resolution half-tone-input color-component values associated with respective ones of the half-tone-input color-component images and a fine-resolution half-tone-input black-component value associated with the half-tone-input black-component image, the half-toning step including:
         a) performing a half-toning operation on a first of the half-tone-input color-component images by comparing the first half-tone-input color-component image's fine-resolution half-tone-input color-component values with quantization thresholds of a first clustered-dot-dither array thereof; and
         b) performing a half-toning operation on a second of the half-tone-input color-component images by comparing the second half-tone-input color-component image's fine-resolution half-tone-input color-component values with quantization thresholds of a second clustered-dot-dither array thereof, and C) output circuitry for applying to the ink-jet printing mechanism electrical command signals that represent the output of a last image-revision step.

24. An apparatus as defined in claim 23 wherein:
A) the black-value-derivation-input color components and black-value-derivation-output black component are expressed within a range that has a range maximum value; and
B) a ratio that the black-value-derivation-output black component bears to the range maximum value is less than or equal to the square of the ratio that the minimum of the black-value-derivation-input color components' values bears to the range maximum.

25. A storage medium containing instructions readable by a computer to configure the computer to function as a printer controller for operating an ink-jet printing mechanism to produce a display in response to electrical source-image signals representing a source image consisting of a plurality of image components associated with respective color components and collectively specified by values of an array of pixels of which the image consists, the value of each pixel consisting of a plurality of relatively fine-resolution component values associated with that pixel, the printer controller comprising:
A) image-revision circuitry for performing a sequence of at least one image-revision step, in which sequence each image-revision step receives electrical signals representing an input image consisting of input pixels and produces therefrom electrical signals representing an output image consisting of output pixels, the input image of a first image-revision step is the source image, the input image of any subsequent image-revision step is the output image of a preceding image-revision step, and one said image-revision step is a half-toning step, the input pixels of whose input image collectively specify a plurality of half-tone-input color-component images, the value of each input pixel of the half-toning step's input image including fine-resolution half-tone-input color-component values associated with respective ones of the half-tone-input color-component images, the half-toning step including:
  i) performing a half-toning operation on a first of the half-tone-input color-component images by comparing the first half-tone-input color-component image's fine-resolution half-tone-input color-component values with quantization thresholds of a first clustered-dot-dither array thereof; and
  ii) performing a half-toning operation on a second of the half-tone-input color-component images by comparing the second half-tone-input color-component image's fine-resolution half-tone-input color-component values with quantization thresholds of a second clustered-dot-dither array thereof, the quantization thresholds of the first and second clustered-dot-dither arrays forming clusters that are spatially offset from each other; and
B) output circuitry for applying to the ink-jet printing mechanism electrical command signals that represent the output of a last image-revision step.

26. A storage medium as defined in claim 25 wherein the half-toning step includes performing a half-toning operation on a third of the half-tone-input color-component images by comparing the third half-tone image's fine-resolution half-tone-input color-component values with quantization thresholds of a third clustered-dot-dither array thereof that form clusters spatially offset from the clusters formed by the first and second clustered-dot-dither arrays.

27. A storage medium as defined in claim 25 wherein:
A) the input pixels of the half-toning step's input image additionally specify a half-tone-input black-component image;
B) the value of each input pixel of the half-toning step's input image includes a fine-resolution half-tone-input black-component value associated with the half-tone-input black-component image; and
C) the half-toning step further comprises performing a non-clustered-dot-dither half-toning operation on the half-tone-input black-component image.

28. A storage medium as defined in claim 27 wherein the non-clustered-dot-dither half-toning operation performed on the half-tone black-component image is performed by comparing the fine-resolution half-tone black-component values with quantization thresholds of a dispersed-dot-dither array.

29. A storage medium as defined in claim 27 wherein the half-toning step includes performing a half-toning operation on a third of the half-tone-input color-component images by comparing the third half-tone image's fine-resolution half-tone-input color-component values with quantization thresholds of a third clustered-dot-dither array thereof that form clusters spatially offset from the clusters formed by the first and second clustered-dot-dither arrays.

30. A storage medium as defined in claim 25 wherein:
A) one image-revision step of the sequence of at least one image-revision step is a black-value-derivation step that precedes the half-toning step;
B) each input pixel of the black-value-derivation step's input image consists of fine-resolution black-value-derivation-input color components; and
C) each output pixel of the black-value-derivation step's output image corresponds to a respective one of the input pixels of the black-value-derivation step's input image and consists of fine-resolution black-value-derivation-output color components and a fine-resolution black-value-derivation-output black component that the black-value-derivation step determines in accordance with a function of the respective input pixel's black-value-derivation-input color components in which the value of the black-value-derivation-output black component is less than the minimum of the black-value-derivation-input color components' values throughout most of that minimum's range.

31. A storage medium as defined in claim 30 wherein:
A) the black-value-derivation-input color components and black-value-derivation-output black component are expressed within a range that has a range maximum value; and
B) a ratio that the black-value-derivation-output black component bears to the range maximum value is less than or equal to the square of the ratio that the minimum of the black-value-derivation-input color components' values bears to the range maximum.

32. A storage medium as defined in claim 31 wherein:
A) the input pixels of the half-toning step's input image additionally specify a half-tone-input black-component image;
B) the value of each input pixel of the half-toning step's input image includes a fine-resolution half-tone-input black-component value associated with the half-tone-input black-component image; and
C) the half-toning step further comprises performing a non-clustered-dot-dither half-toning operation on the half-tone-input black-component image.

33. A storage medium as defined in claim 32 wherein the half-toning step includes performing a half-toning operation on a third of the half-tone-input color-component images by comparing the third half-tone image's fine-resolution half-tone-input color-component values with quantization thresholds of a third clustered-dot-dither array thereof that form clusters spatially offset from the clusters formed by the first and second clustered-dot-dither arrays.

34. A storage medium as defined in claim 31 wherein the half-toning step includes performing a half-toning operation on a third of the half-tone-input color-component images by comparing the third half-tone image's fine-resolution half-tone-input color-component values with quantization thresholds of a third clustered-dot-dither array thereof that form clusters spatially offset from the clusters formed by the first and second clustered-dot-dither arrays.

35. A computer-readable storage medium having instructions for operating an ink-jet printing mechanism to produce a display in response to electrical source-image signals representing a source image consisting of a plurality of image components associated with respective color components and collectively specified by values of an array of pixels of which the image consists, the value of each pixel consisting of a plurality of relatively fine-resolution component values associated with that pixel, the storage medium comprising:

A) image-revision circuitry for performing a sequence of image-revision steps, in which sequence each image-revision step receives electrical signals representing an input image consisting of input pixels and produces therefrom electrical signals representing an output image consisting of output pixels, the input image of a first image-revision step is the source image, and the input image of any subsequent image-revision step is the output image of a preceding image-revision step, wherein:

i) one said image-revision step of the sequence of image-revision steps is a black-value-derivation step each input pixel of whose input image consists of fine-resolution black-value-derivation-input color components and each output pixel of whose output image corresponds to a respective one of the input pixels of the black-value-derivation step's input image and consists of fine-resolution black-value-derivation-output color components and a fine-resolution black-value-derivation-output black component that the black-value-derivation step determines in accordance with a function of the respective input pixel's black-value-derivation-input color components in which the value of the black-value-derivation-output black component is less than the minimum of the black-value-derivation-input color components' values throughout most of that minimum's range; and ii) a subsequent image-revision step in the sequence of image-revision steps is a half-toning step, the input pixels of whose input image collectively specify a plurality of half-tone-input color-component images and a half-tone-input black-component image, the value of each input pixel of the half-toning step's input image including fine-resolution half-tone-input color-component values associated with respective ones of the half-tone-input color-component images and a fine-resolution half-tone-input black-component value associated with the half-tone-input black-component image, the half-toning step including:

a) performing a half-toning operation on a first of the half-tone-input color-component images by comparing the first half-tone-input color-component image's fine-resolution half-tone-input color-component values with quantization thresholds of a first clustered-dot-dither array thereof, and b) performing a half-toning operation on a second of the half-tone-input color-component images by comparing the second half-tone-input color-component image's fine-resolution half-tone-input color-component values with quantization thresholds of a second clustered-dot-dither array thereof, and B) output circuitry for applying to the ink-jet printing mechanism electrical command signals that represent the output of a last image-revision step.

36. A storage medium as defined in claim 35 wherein:

A) the black-value-derivation-input color components and black-value-derivation-output black component are expressed within a range that has a range maximum value; and B) a ratio that the black-value-derivation-output black component bears to the range maximum value is less than or equal to the square of the ratio that the minimum of the black-value-derivation-input color components' values bears to the range maximum.

* * * * *